United States Patent [19]

Kaufmann

[11] Patent Number: 5,778,029
[45] Date of Patent: Jul. 7, 1998

[54] SIGNAL CONDITIONER WITH SYMBOL ADDRESSED LOOKUP TABLE PRODUCING VALUES WHICH COMPENSATE LINEAR AND NON-LINEAR DISTORTION USING TRANSVERSAL FILTER

[75] Inventor: John Kaufmann, Palo Alto, Calif.

[73] Assignee: Lockheed Martin Aerospace Corporation, Bethesda, Md.

[21] Appl. No.: 634,514

[22] Filed: Apr. 18, 1996

Related U.S. Application Data

[63] Continuation of Ser. No. 61,157, May 13, 1993, abandoned.
[51] Int. Cl.$^6$ .............................. H04L 25/03; H04L 27/36
[52] U.S. Cl. ........................ 375/296; 375/298; 332/103
[58] Field of Search ............................ 375/229, 230, 375/232, 235, 266, 284, 285, 297, 278, 296, 295, 198; 333/18, 28 R, 138, 139, 165, 166, 167, 202, 203; 364/724.01, 724.03, 724.14, 724.16, 724.19, 724.2, 572; 332/107, 123, 124, 159, 160, 103, 104; 327/261; 330/10, 149; 455/126, 127, 91

[56] References Cited

U.S. PATENT DOCUMENTS

| | | | |
|---|---|---|---|
| 3,890,572 | 6/1975 | Desblanche et al. | 375/15 |
| 4,291,277 | 9/1981 | Davis et al. | 330/149 |
| 4,430,743 | 2/1984 | Watanabe | 375/15 |
| 4,800,572 | 1/1989 | Nossek et al. | 375/232 |
| 4,805,189 | 2/1989 | Mahoney | 375/11 |
| 4,975,927 | 12/1990 | Yoshida | 375/15 |
| 5,025,234 | 6/1991 | De Luca | 375/235 |
| 5,200,977 | 4/1993 | Ohnishi et al. | 375/235 |
| 5,200,978 | 4/1993 | Lo Curto et al. | 375/15 |

Primary Examiner—Tesfaldet Bocure
Assistant Examiner—William Luther
Attorney, Agent, or Firm—Kenneth W. Float

[57] ABSTRACT

A signal conditioner comprising several embodiments of transversal (FIR) filters that utilize symbol addressed multiplier lookup tables. In particular, five embodiments in accordance with the principles of the present invention are described. The present invention generates a predistorted waveform within the transversal filter that provides for compensation for the effects of nonlinear amplifiers and intersymbol interference. The present invention may be employed to digitally generate an arbitrary baseband waveform that represents a limited alphabet of symbols. The present invention dramatically simplifies the implementation of FIR filters where the application of the FIR filter is to provide a transversal filter function for waveforms that represent symbols. The degree of simplification is related to the number of bits that define the size of the symbol alphabet as compared to the number of bits required to adequately represent a digital sample of the waveform. Typically 2, 3 or 4 bits represent the alphabet of communication symbols, whereas waveforms require as a minimum 8 bits of quantization. A second aspect of the present invention comprises combining the function of generating arbitrary waveforms with the symbol addressed lookup tables that are part of the FIR filter. The waveform is precompensated to minimize the effect of intersymbol interference and is prewarped to compensate for transmitter nonlinearities.

3 Claims, 3 Drawing Sheets

SIGNAL CONDITIONER WITH SYMBOL ADDRESSED LOOKUP TABLE PRODUCING VALUES WHICH COMPENSATE LINEAR AND NON-LINEAR DISTORTION USING TRANSVERSAL FILTER

CROSS REFERENCE TO RELATED APPLICATIONS

This application is a continuation of U.S. patent application Ser. No. 08/061,157, filed May 13, 1993, now abandoned.

BACKGROUND OF THE INVENTION

The present invention generally relates to signal conditioners, and more particularly, to transversal (FIR) filters that use symbol addressed lookup tables.

Telecommunication power transmitters, such as traveling wave tube amplifiers, exhibit nonlinear behavior in their amplitude and phase transfer function. These non-linear characteristics result in distorted transmit waveforms that degrade the performance of telecommunication channels. When applying digital modulating waveforms to a transmitter amplifier channel, additional linear distortions are experienced due to intersymbol interference (ISI). ISI is generated as a result of non-ideal phase and frequency characteristics of the transmitter chain. Some compensation for these distortions can be achieved by predistorting the signal prior to its application to a power amplifier. Predistortion is conceptually performed in two steps. The first step is to predistort the digital modulation in amplitude and phase so that the resultant signal at the output of the power amplifier is undistorted. The second step is to pre-equalize the modulating waveform so that the effect of ISI is minimized. In the absence of non-linearities, the act of pre equalization in the transmitter is equivalent to performing equalization of the transmitted waveform in the receiver.

Prior art techniques for generating arbitrary digital waveforms that represent a symbol include the use of lookup tables. The symbol is used to address a lookup table that is programmed to output a representative digital waveform. Generally this waveform has two quadrature components. Compensation for nonlinear distortion is accomplished by precomputing the requisite corrections and programming the lookup tables with the predistorted waveforms. Prior art techniques that compensate for ISI make use of a transversal filter architecture to distort the waveform such that intersymbol interference at the output of the transmitter is minimized. A finite impulse response (FIR) filter with taps spaced by a delay of one symbol performs such a function. The FIR filter forms the weighted sum of the waveforms which represent a finite number of past symbols and future symbols. The weighting factors are predetermined such that when this sum is added to the waveform representing the current symbol, the factors which cause subsequent ISI are effectively cancelled. In a digital implementation of such a FIR filter pre-equalizer, the waveform is commonly multiplied at each tap by means of a multiplier circuit and a register containing the weighting factor. An alternative implementation is by application of digital lookup tables that are addressed by the digital word representing the waveform at each tap. The lookup tables are programmed to output a weighted representation of the input address. Quadrature waveforms require a FIR filter for each of the two quadrature components. An additional pair of FIR filters may be required to compensate for any "cross" effects.

Conventional techniques have not provided for a transversal (FIR) filter that utilizes symbol addressed lookup tables. U.S. Pat. No. 5,113,414 issued to Karam et al. provides an excellent description of the prior art for predistorting waveforms in digital transmission system systems. However, the Karam et al. technique for compensation is quite different and more complicated than the technique of the present invention. Karam makes use of a transmit filter (and does not indicate if it is digital or analog) that applies an oversampled waveform to a lookup table which in turn generates a correction that is applied to a multiplier.

It is therefore an objective of the present invention to provide for a signal conditioner that implements a transversal filter and uses symbol addressed lookup tables. It is also an objective of the present invention to provide for a transmit conditioner that compensates for the effects of nonlinear amplifiers and intersymbol interference.

SUMMARY OF THE INVENTION

The present invention is a signal conditioner that comprises several embodiments of transversal (FIR) filters that utilize symbol addressed multiplier lookup tables. In particular, five embodiments in accordance with the principles of the present invention are described. The present invention generates a predistorted waveform within the transversal filter. The present invention also provides for an extension of this idea, with no additional complexity, that compensates for the effects of nonlinear amplifiers and intersymbol interference. The present invention may be employed to digitally generate any arbitrary baseband waveform that represents a limited alphabet of symbols. The waveform is precompensated to minimize the effect of intersymbol interference (ISI) and prewarped to compensate for transmitter nonlinearities.

A first embodiment comprises a transversal filter having a symbol addressed multiplier lookup table. In the first embodiment, the transversal filter processes input symbols to generate baseband output waveforms comprising quantized signal waveforms that are representative of the input symbols. The transversal filter comprises an input for receiving binary codes representing input symbols, and a plurality of serially coupled one symbol delay devices for sequentially delaying the input symbols. A plurality of symbol addressed lookup tables are respectively coupled to the input and one symbol delay devices for receiving the input symbols and delayed versions thereof and for providing respective output signals that correspond to scaled amplitude values of the input symbols. The output signals comprise a predistorted waveform that compensates for the effects of intersymbol interference and transmitter nonlinearities. A plurality of summing devices are individually coupled to predetermined pairs of the plurality of symbol addressed lookup tables that process the respective output signals to generate the baseband output waveforms that are representative of the input symbols.

A second embodiment provides for combined through and cross multiplier lookup tables in a single lookup table used for processing respective in-phase and quadrature signals. In the second embodiment, the transversal filter includes both in-phase and quadrature equalizers. In the second embodiment, the transversal filter comprises an input for receiving binary codes representing input symbols, and a plurality of serially coupled one symbol delay devices for sequentially delaying the input symbols. First and second symbol addressed lookup tables are respectively coupled to the input and to the plurality of serially coupled one symbol delay devices for respectively receiving the input symbols and delayed versions thereof and for providing respective in-phase and quadrature output signals that correspond to scaled amplitude values of the input symbols and that comprise a predistorted waveform that compensates for the effects of intersymbol interference and transmitter nonlinearities. A plurality of sets of summing devices are respectively coupled to predetermined pairs of the plurality of symbol addressed lookup tables that process the respective in-phase and quadrature output signals to generate in-phase and quadrature baseband output waveforms that are representative of the input symbols.

A third embodiment provides for common symbol delay elements for delaying both in-phase and quadrature signals prior to the multiplier addressed lookup tables. In the third embodiment, the transversal filter comprises an input for receiving binary codes representing input symbols, a plurality of common one symbol delay devices for delaying both the in-phase and quadrature signals that comprise the input symbols. A plurality of symbol addressed lookup table are appropriately coupled to the input and to outputs of the respective one symbol delay devices for receiving the input symbols and delayed versions thereof and for providing a plurality of output signals that correspond to scaled amplitude values of the input symbols. The output signals comprise a predistorted waveform that compensates for the effects of intersymbol interference and transmitter nonlinearities. A plurality of sets of summing devices are coupled to the lookup tables for summing the respective in-phase and quadrature output signal to provide in-phase and quadrature waveform output signals that comprises baseband output waveforms that are representative of the input symbols.

A fourth embodiment provides for a transversal filter that combines the elements of each of the previous three filters into one a single large symbol addressed multiplier lookup table. This large symbol addressed multiplier lookup table has a size that is substantially the same as the combined sizes of the individual lookup tables used in the prior embodiments. In the fourth embodiment, the transversal filter comprises an input for receiving binary codes representing input symbols, and the single symbol addressed lookup table coupled to the input for receiving the input symbols and for providing a plurality of output signals that correspond to scaled amplitude values of the input symbols. The output signals comprise a predistorted waveform that compensates for the effects of intersymbol interference and transmitter nonlinearities. A first one symbol delay device is coupled to the delay device for delaying a first output signal therefrom. A first summing device is coupled to the lookup table and to the first one symbol delay device for summing the first output signal and a second output signal from the lookup table to provide a summed output signal. A second one symbol delay device for delaying the summed output signal from the first summing device. A second summing device is coupled to the lookup table and to the second one symbol delay device for summing the second output signal and a third output signal from the lookup table to provide a second summed output signal that comprises baseband output waveforms that are representative of the input symbols.

The above-summarized four transversal filter embodiments provide for significant simplifications in FIR filter applications such as in pre-equalizing intersymbol interference in transmitter waveforms.

A fifth embodiment incorporates prewarping of the input symbols without any change in hardware complexity. In the fifth embodiment, the transversal filter comprises an input for receiving binary codes representing input symbols, and a symbol addressed lookup table based prewarper and pre-equalizer coupled to the input for receiving the input symbols and for providing output signals that correspond to prewarped and pre-equalized scaled amplitude values of the input symbols. The output signals comprise a predistorted and prewarped waveform that compensates for the effects of intersymbol interference and transmitter nonlinearities.

The present invention dramatically simplifies the implementation of FIR filters where the application of the FIR filter is to provide a transversal filter function for waveforms that represent symbols. The degree of simplification is related to the number of bits that define the size of the symbol alphabet as compared to the number of bits required to adequately represent a digital sample of the waveform. Typically 2,3, or 4 bits represent the alphabet of communication symbols, whereas the waveforms require as a minimum 8 bits of quantization. One aspect of the present invention is to use symbol addressed lookup tables rather than digital sample addressed lookup tables in implementing FIR filter functions. A second aspect of the present invention comprises combining of the function of generating arbitrary waveforms with the symbol addressed lookup tables that are part of the FIR filter function.

The present invention thus provides for a much simpler and efficient implementation of an arbitrary waveform generator and FIR filter for applications where the input waveform is defined by a symbol alphabet that may be specified with fewer bits then an equivalent quantized waveform.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENTS

By way of introduction, the present invention comprises a finite impulse response (FIR) filter for use in digital telecommunication transmission systems. By itself, the present FIR filter results in simplified filter design and better performance than conventional FIR filters. Pre-equalization of the transmit waveform is one possible application of the FIR filter. The present invention may also provide a non-linear prewarping function without adding to the complexity of the filter design. A single processing function in accordance with the present invention performs waveform pre-distortion so that the transmitted waveform compensates for the nonlinear effects of a power amplifier and so that the intersymbol interference caused by a non-ideal transmitter chain is reduced.

Figure 1A:
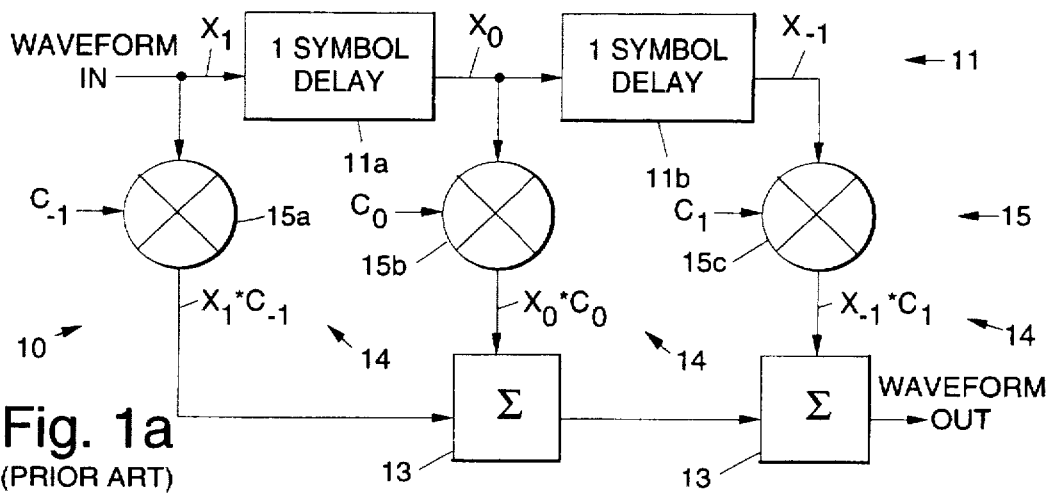
FIG. 1a illustrates a conventional three tap filter using multipliers to scale the delayed input waveforms.

Referring to FIG. 1a it illustrates a conventional three tap FIR filter 10 using multipliers 15 for scaling the input waveform and its delayed replicas. The conventional FIR filter 10 is comprised of a tapped delay line 11, or discrete delay elements 11a, 11b, means 14 for scaling the signal at each tap of the tapped delay line 11 by multiplication with a scaling coefficient, and a plurality of summing devices 13 to add the result of the scaled tap signals. The signals are represented by digital waveforms such as baseband signals. Sampling is usually performed at the symbol rate and the delay elements 11a, 11b are usually digital registers that are clocked at the symbol rate. Scaling coefficients (C) may reside in digital registers, or if they are not to be modified, may be hardwired into the multiplier structure.

Figure 1B:
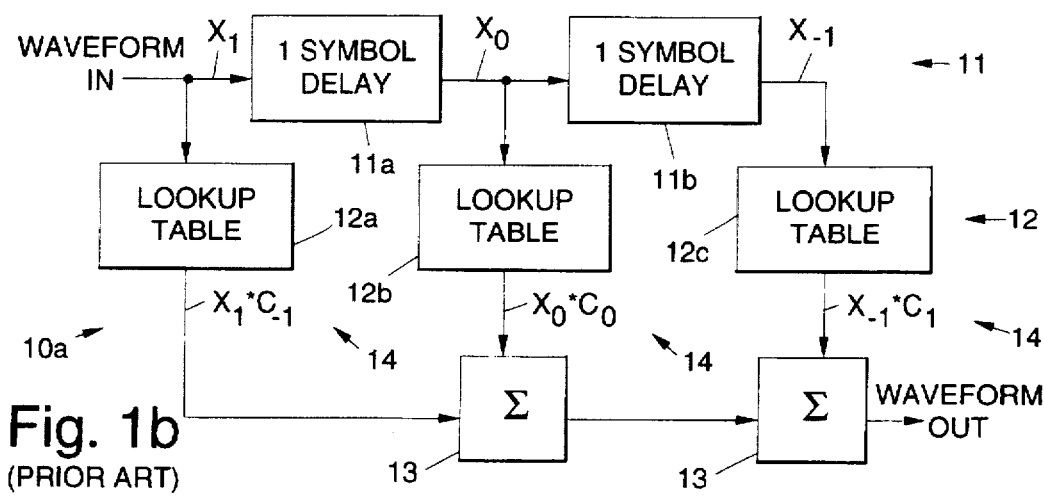
FIG. 1b illustrates a conventional three tap filter using multiplier lookup tables to scale the delayed input waveforms.

A well known alternative to using multipliers 15 is to use digital lookup tables 12. FIG. 1b illustrates a conventional three tap filter 10a using multiplier lookup tables 12a, 12b, 12c to scale the delayed input waveforms. The operation of the filter 10a is similar to that of filter 10, except that the scaled tap signals are derived from the multiplier lookup tables 12 prior to summing. Each digital lookup table 12 may be comprised of a programmable memory device (such as a RAM or PROM) or a fixed memory (ROM). The signal that is to be scaled is used as an input address to the lookup table 12. Each address position the lookup table 12 contains an appropriately scaled value of the input signal. Such a lookup table scheme is effective if the precision of the input signal is limited, since the size of the lookup table 12 increases exponentially with the number of signal quantization levels. For example, with an 8 bit input and N bit output, the table is of size 256×N bits. On the other hand, for a 16 bit input and N bit output the table is of size 65,536×N bits.

Figure 2:
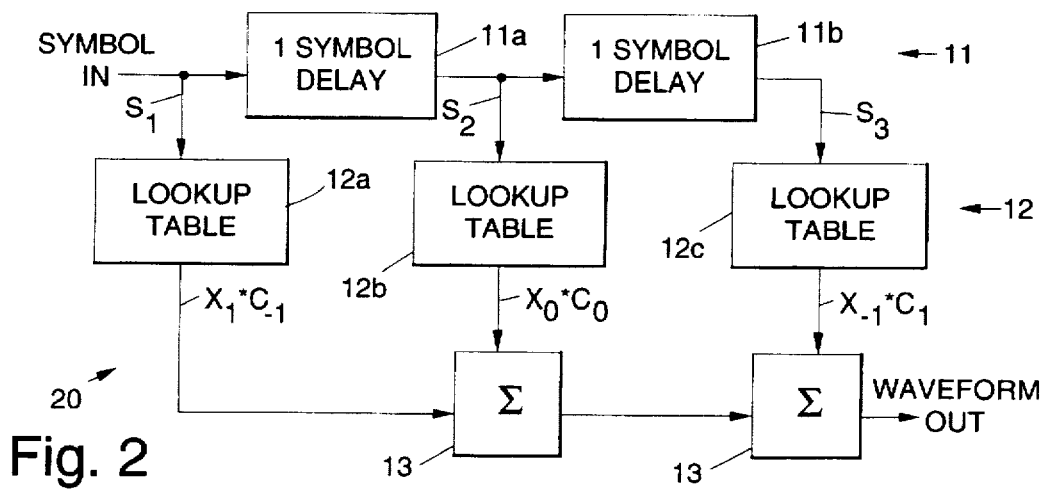
FIG. 2 illustrates a first embodiment of a three tap filter using symbol addressed multiplier lookup tables in accordance with the principles of the present invention.

One aspect of the present invention is to recognize that when filtering digital modulating waveforms, it is not necessary to represent the input waveform in a FIR filter as a digital amplitude of the desired waveform. It is sufficient to represent the input waveform as a symbol value. A FIR filter 20 embodying this concept is shown in FIG. 2. More specifically, and by way of example, FIG. 2 illustrates a three tap filter 20 using symbol addressed multiplier lookup tables 12 in accordance with the principles of the present invention. Inputs to the filter 20 are binary codes representing symbols, and outputs are quantized signal waveforms. The selection of a symbol code is of no consequence. It is also to be understood that the illustration of the present invention using a three tap filter 20 is by way of example only. Any number of taps may be utilized in the filter 20 of the present invention.

For n-ary signalling, the number of bits that define a symbol are of size n. For example, in QPSK signaling, only two bits represent a symbol. At each filter tap, the lookup table 12 has size n×N. At each address position, the lookup table 12 contains the appropriately scaled amplitude value of the input symbol. The primary benefit of this scheme is to dramatically reduce the size of the lookup tables 12. A secondary benefit is increased arithmetic precision since the lookup table 12 generates an exact (within the quantization limits of the number of output bits) scaled amplitude value of the symbol rather then the scaled value of the quantized symbol. Another benefit is that the delay elements 11a, 11b are of size n bits (for n-ary signalling) rather then the number of bits required to adequately represent the signal waveform amplitude (usually at least 8 bits).

Figure 3:
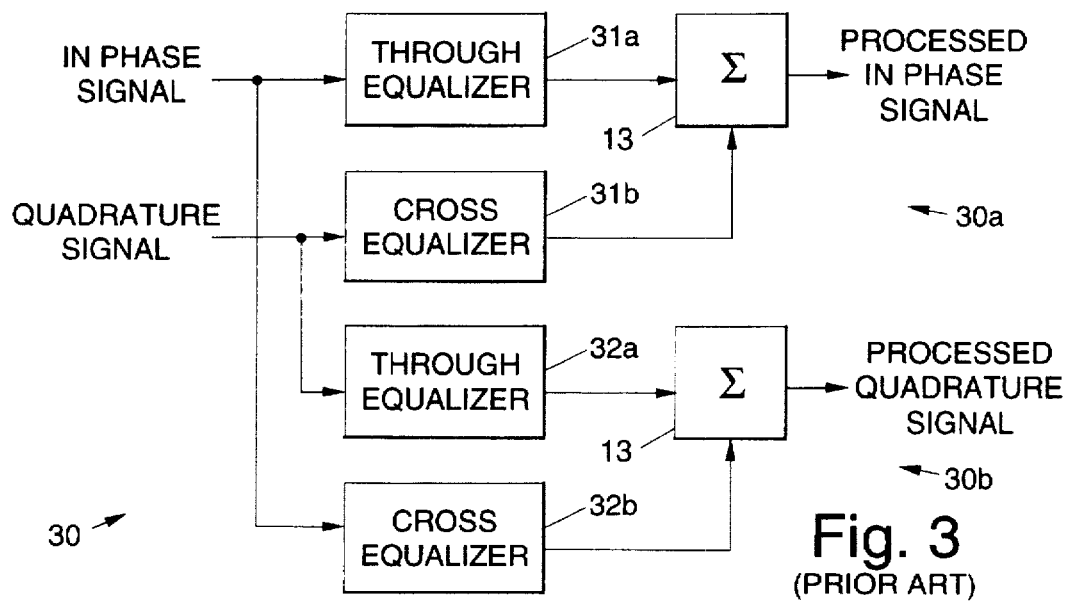
FIG. 3 illustrates a conventional equalizer for quadrature waveforms.

In a practical application for n-ary orthogonal waveforms, the modulating signal is complex in the sense that it has in-phase and quadrature components. Consider a FIR filter implementation of a conventional pre-equalizer 30. FIG. 3 illustrates a conventional pre-equalizer 30 for quadrature waveforms that comprises a conventional transversal filter. The pre-equalizer 30 includes four FIR filters 31a, 31b, 32a, 32b comprising a pair of pre-equalizers 30a that generate in-phase signals and a pair of pre-equalizers 30b that generate quadrature signals. In particular, to generate the pre-equalized in-phase waveform the classic scheme is to pre-equalize the in-phase waveform with "through" coefficients, pre-equalize the quadrature waveform with "cross" coefficients and to add the results. Except for a change in sign of the cross coefficients an analogous scheme is used to generate the pre-equalized quadrature waveform.

Figure 4:
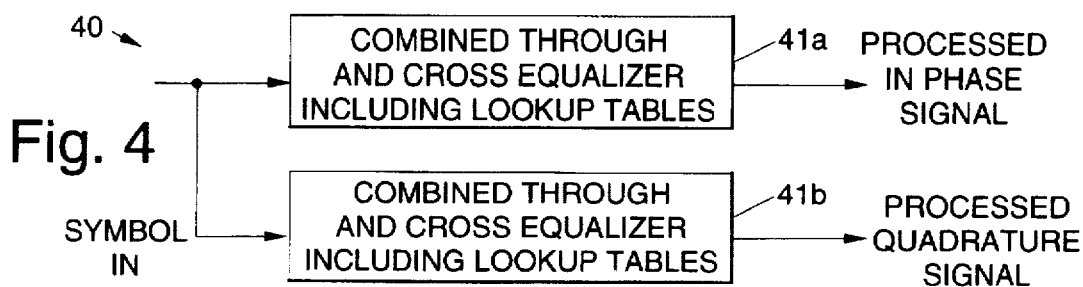
FIG. 4 illustrates a second embodiment of an equalizer for quadrature waveforms in accordance with the principles of the present invention.

The previously discussed lookup table implementation may also be applied to the just-described pre-equalizer architecture but with another dramatic simplification as will be described with reference to FIG. 4. FIG. 4 illustrates a simplified pre-equalizer 40 for in-phase and quadrature waveforms in accordance with the principles of the present invention. Since input signals (symbols) are no longer represented by a digital representation of a symbol waveform, the through and cross equalizers 31a, 31b, 32a, 32b of FIG. 3 may be integrated into two lookup tables and thus a first equivalent equalizer 41a is provided for generating the pre-equalized in-phase waveforms, and a second equalizer 41b provides for generating the pre-equalized quadrature waveforms. Each of the equalizers 41a, 41b comprising the pre-equalizer 40 may be constructed in the manner described with reference to FIG. 2 above, for example. The lookup tables in the respective equalizers 41a, 41b of FIG. 4 comprise signals that are not the same. The in-phase component of the product of the complex waveform and the complex scaling coefficient is stored in the first equalizer 41a. The quadrature component of the product of the complex waveform and the complex scaling coefficient is stored in the second equalizer 41b.

Figure 5:
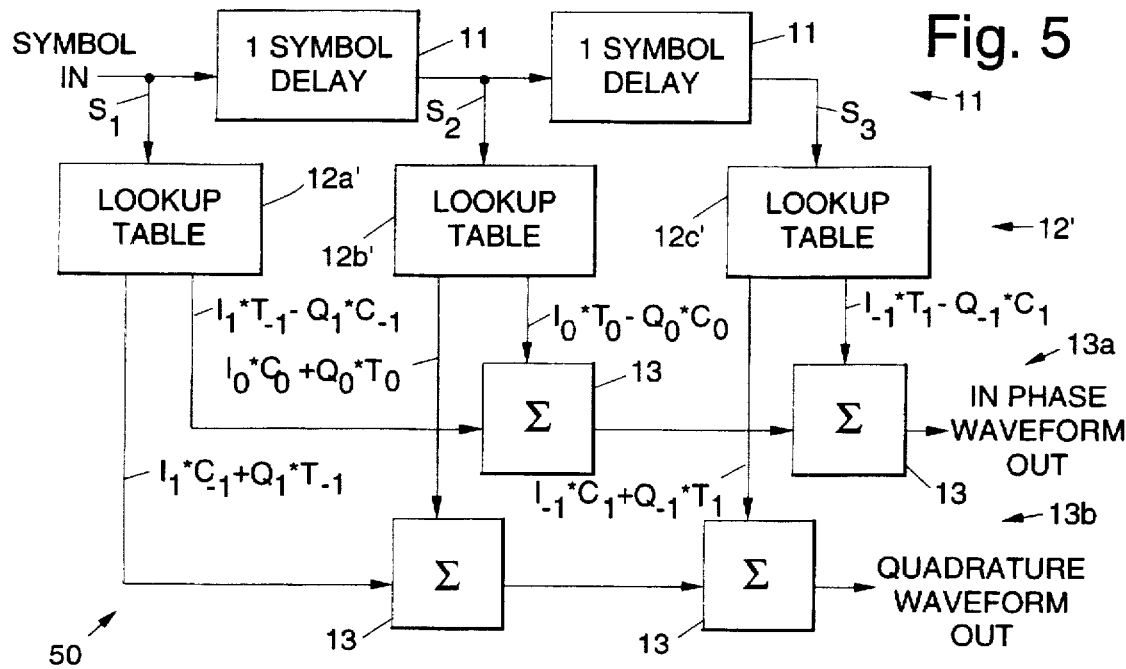
FIG. 5 illustrates a third embodiment of a three tap filter using symbol addressed multiplier lookup tables in accordance with the principles of the present invention.

FIG. 5 illustrates this architecture in more detail and also indicates another simplification provided by the present invention. The delay elements 11 for the two pre-equalizers 41a, 41b contain the same signal (i.e. symbol) and therefore they may be combined in the manner shown in FIG. 5 to produce the illustrated transversal filter 50. The transversal filter 50 is comprised of the tapped delay line 11, or discrete delay elements 11a, 11b, a plurality of lookup tables 12' (comprising lookup tables 12a', 12b', 12c', 12 that are adapted to output scaled inphase and quadrature output signals, and two sets of summing devices 13a, 13b to add the result of the respective scaled in-phase and quadrature output signals.

Figure 6:
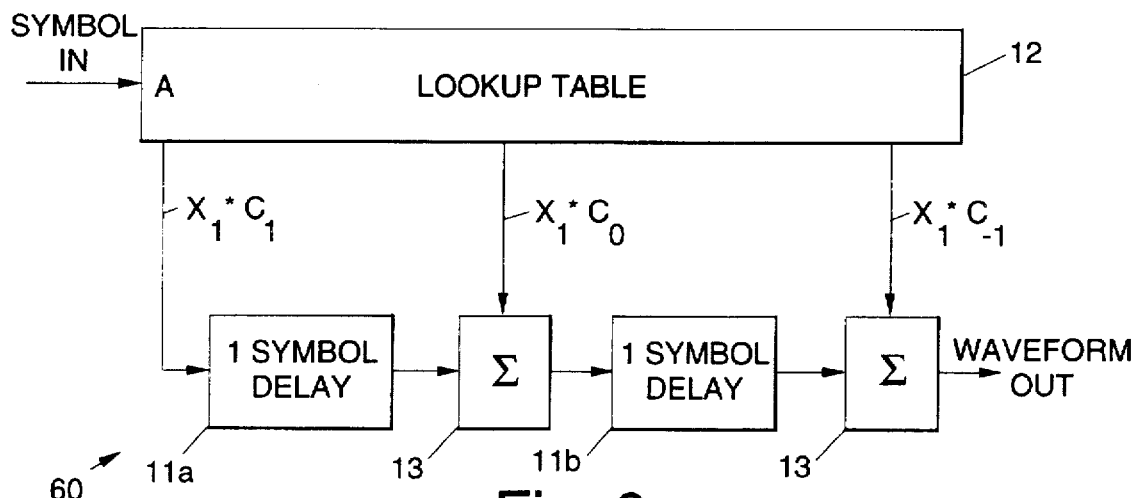
FIG. 6 illustrates a fourth embodiment of a three tap filter using a common symbol addressed multiplier lookup table in accordance with the principles of the present invention.

Another variation of the present invention which may be advantageous for some implementations is shown in FIG. 6, and comprises a pre-equalizer 60. This architecture represents an alternative to the equalizer 20 of FIG. 2, or each of the equalizers 41a, 41b shown in FIG. 4. The summing devices 13 (adders) are separated by one symbol delay elements 11. A single lookup table 12 is employed in the pre-equalizer 60 of FIG. 6. However, fragmentation into several tables may be necessary due to the large number of bits. One advantage of the architecture for the pre-equalizer 60 is that even with fragmentation, a common address decoder may be utilized to generate addresses in the lookup table 12. This has advantages in high speed applications.

Figure 7:
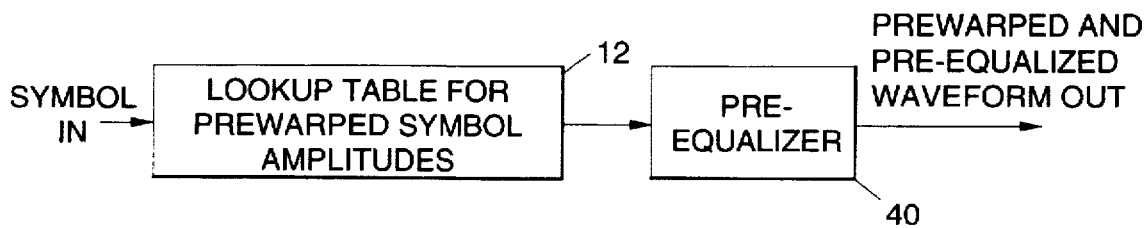
FIG. 7 illustrates a conventional technique for pre-warping and pre-equalizing a digital waveform.

If one of the pre-equalizers 20, 40, 50, 60 is to be used in conjunction with a nonlinear distortion compensating modulator, for example, then another dramatic improvement may be realized. As previously indicated, the nonlinear amplitude and phase behavior of a power amplifier may be negated by warping the signal prior to applying it to the power amplifier. FIG. 7 illustrates a conventional means for prewarping and pre-equalizing 70 comprising a symbol prewarper 12 (lookup table 12) and a serially coupled pre-equalizer 40. The warping may be implemented using the lookup table 12 and then the warped digital waveform value is pre-equalized in the pre-equalizer 40 to produce a prewarped and pre-equalized waveform output from the filter 70.

Figure 8:
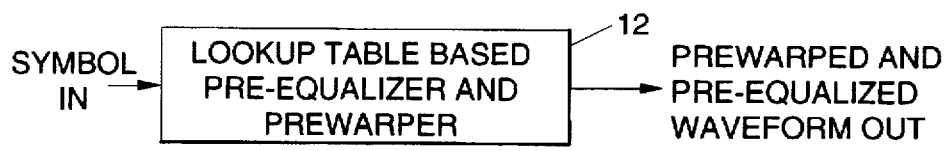
FIG. 8 illustrates a first embodiment of a transversal filter for pre-warping and pre-equalizing a digital waveform in accordance with the principles of the present invention.

However, and in accordance with the present invention, if the modulating signal is in digital form, then this warping may be implemented in the lookup table 12 using a symbol value as an input thereto and a warped digital waveform value as an output thereof. More specifically, and with reference to FIG. 8, it illustrates a lookup-table-based prewarper pre-equalizer 80 that provides for pre-warping and pre-equalizing of a digital waveform (input symbol) in accordance with the principles of the present invention. The prewarping operation conventionally performed in the pre-equalizer 40 is integrated into the lookup table 12 with no additional addition in complexity. That is, the stored values in the lookup table 12 are the products of filter coefficients and the prewarped symbol amplitudes. The prewarper pre-equalizer 80 provides a universal means for pre-warping the input symbol in addition to pre-equalizing the input symbol. This scheme not only eliminates a lookup table 12, but also reduces the associated quantization errors. Furthermore, the equalizer of FIG. 8 is programmable. The scaling coefficients are programmable, and the waveforms are also independently programmable. Such programming is generally understood in the art and will not be further described herein.

The previous applications of the present invention were related to transmitter functions. Some receiver designs that utilize decision feedback techniques may also benefit from the present invention. For instance, there is a well known technique known as a decision feedback equalizer. A conventional decision feedback equalizer has two components similar to the pre-equalizer architecture shown in FIG. 7. The first component equalizes "future" symbols in a classic FIR filter architecture. The second component utilizes the waveform generated by detected past symbols as an input to a FIR filter. The present invention may be applied to simplify the second component which results in the embodiment of a decision feedback equalizer similar to the architecture shown in FIG. 8.

Thus there has been described new and improved signal conditioners employing transversal (FIR) filters that use symbol addressed lookup tables. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A signal conditioner for use in a transmitter for processing input symbols to generate baseband pre-equalized and predistorted output waveforms comprising quantized in-phase and quadrature signal waveforms that are representative of the input symbols, said signal conditioner comprising:

an input for receiving binary codes representing said input symbols;

an in-phase equalizer that comprises:
 a plurality of serially coupled one symbol delay devices for sequentially delaying the input symbols;
 a plurality of serially coupled one symbol delay devices for sequentially delaying the input symbols;
 a plurality of symbol addressed lookup tables respectively coupled to the input and to outputs of the plurality of serially coupled one symbol delay devices for respectively receiving the input symbols and delayed versions thereof and for providing respective in-phase output signals that correspond to pre-equalized, scaled amplitude values of the input symbols and that comprise a predistorted waveform that compensates for the effects of intersymbol interference and transmitter nonlinearities; and a first plurality of summing devices comprising a first summing device coupled to first and second ones of the plurality of symbol addressed lookup tables and a second summing device coupled to an output of the first summing device and a third one of the plurality of symbol addressed lookup tables that process the respective in-phase output signals to generate the baseband in-phase output waveforms that are representative of the input symbols; and a quadrature equalizer that comprises:
 a second plurality of summing devices comprising a third summing device coupled to the first and second ones of the plurality of symbol addressed lookup tables and a fourth summing device coupled to an output of the third summing device and the third one of the plurality of symbol addressed lookup tables that process the respective quadrature output signals to generate the baseband quadrature output waveforms that are representative of the input symbols;
 and wherein the plurality of symbol addressed lookup tables provide respective quadrature output signals that correspond to pre-equalized, scaled amplitude values of the input symbols and that comprise a predistorted waveform that compensates for the effects of intersymbol interference and transmitter nonlinearities.

2. A signal conditioner for use in a transmitter for processing input symbols corresponding to complex input waveforms to generate baseband pre-qualized and predistorted output waveforms comprising quantized in-phase and quadrature signal waveforms that are representative of the input symbols, said signal conditioner comprising:

an input for receiving binary codes representing said input symbols;

an in-phase equalizer that comprises:
 a plurality of serially coupled one symbol delay devices for sequentially delaying the input symbols;
 a plurality of symbol addressed lookup tables respectively coupled to the input and to outputs of the plurality of serially coupled one symbol delay devices for respectively receiving the input symbols and delayed versions thereof and for providing respective in-phase output signals that corresponds to pre-equalized, scaled amplitude values of the input symbols and that comprise a predistorted waveform that compensates for the effects of intersymbol interference and transmitter nonlinearities; and a first plurality of summing devices coupled to the plurality of symbol addressed lookup tables that process the respective in-phase output signals to generate the baseband in-phase output waveforms that are representative of the input symbols; and a quadrature equalizer that comprises:

a second plurality of summing devices coupled to the plurality of symbol addressed lookup tables that process the respective quadrature output signals to generate the baseband quadrature output waveforms that are representative of the input symbols;

and wherein the plurality of symbol addressed lookup tables provide respective quadrature output signals that correspond to pre-equalized, scaled amplitude values of the input symbols and that comprise a predistorted waveform that compensates for the effects of intersymbol interference and transmitter nonlinearities.

3. A signal conditioner for use in a transmitter for processing input symbols corresponding to complex input waveforms to generate baseband pre-equalized and predistorted output waveforms comprising quantized in-phase and quadrature signal waveforms that are representative of the input symbols, said signal conditioner comprising:

an input for receiving binary codes representing said input symbols;

a plurality of serially coupled one symbol delay devices for sequentially delaying the input symbols;

a plurality of symbol addressed lookup tables respectively coupled to the input and to outputs of the plurality of serially coupled one symbol delay devices that store a plurality of scaling factors that comprise products of the complex input waveforms and complex scaling coefficients, for respectively receiving the input symbols and delayed versions thereof and for providing respective in-phase output signals that correspond to pre-equalized, scaled amplitude values of the input symbols and that form a predistorted waveform that compensates for the effects of intersymbol interference and transmitter nonlinearities; and a first plurality of summing devices coupled to the plurality of symbol addressed lookup tables that process the respective in-phase output signals to generate the baseband in-phase output waveforms that are representative of the input symbols; and a second plurality of summing devices coupled to the plurality of symbol addressed lookup tables that process the respective quadrature output signals to generate the baseband quadrature output waveforms that are representative of the input symbols.

* * * * *